(No Model.)

B. HOLT.
FEEDING MECHANISM FOR COMBINED HARVESTERS AND THRASHERS.

No. 416,618. Patented Dec. 3, 1889.

Witnesses,
Geo. H. Strong
J. A. Nourse

Inventor,
Benjamin Holt.
By Dewey & Co.
Attys

UNITED STATES PATENT OFFICE.

BENJAMIN HOLT, OF STOCKTON, CALIFORNIA.

FEEDING MECHANISM FOR COMBINED HARVESTER AND THRASHER.

SPECIFICATION forming part of Letters Patent No. 416,618, dated December 3, 1889.

Application filed August 21, 1889. Serial No. 321,513. (No model.)

*To all whom it may concern:*

Be it known that I, BENJAMIN HOLT, of Stockton, San Joaquin county, State of California, have invented an Improvement in Feeding Mechanism for a Combined Harvester and Thrasher; and I hereby declare the following to be a full, clear, and exact description of the same.

My invention relates to certain improvements in traveling harvesters in which the grain which is cut by the sickle is transported by a carrying-belt, called the "draper," and discharged upon what is known as the "self-feeder," from which it is delivered to the cylinder of the thrashing-machine, passing thence to the cleaning apparatus.

My present invention consists of a device for assisting in the delivery of the straw from the draper to the self-feeder and preventing the lodgment and clogging of the straw in its progress from the header to the thrasher.

Figure 1:
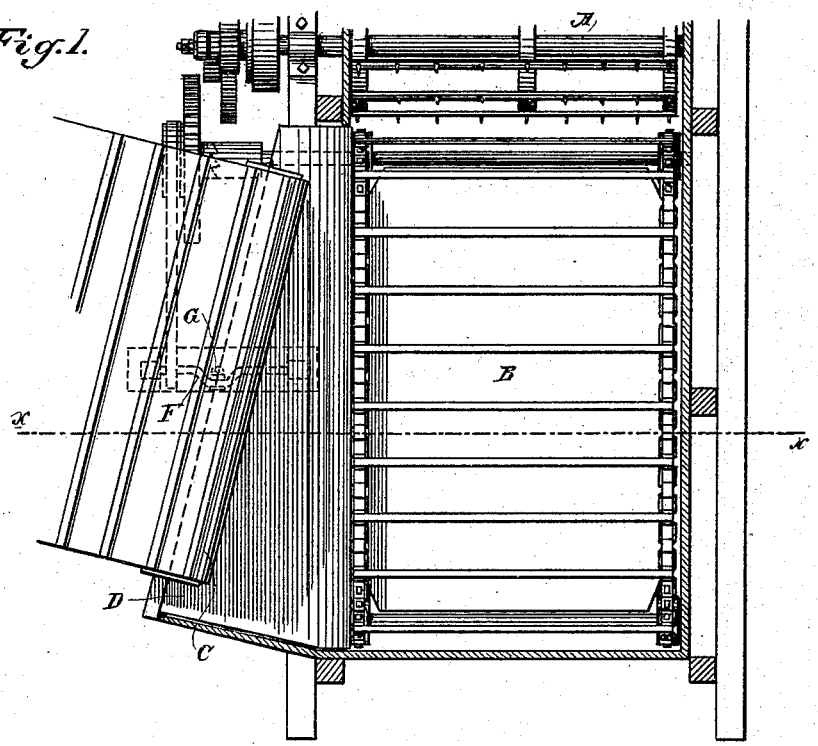
Figure 2:
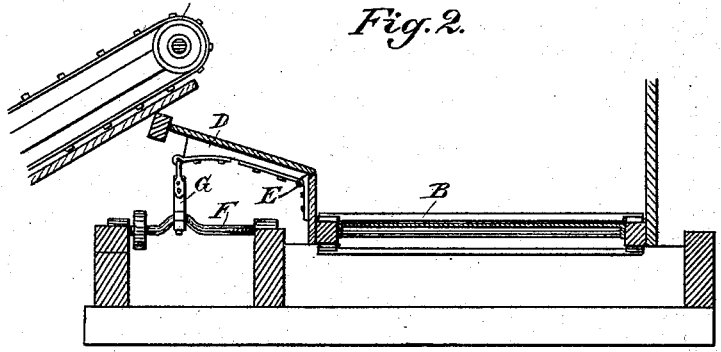

Referring to the accompanying drawings for a more complete explanation of my invention, Figure 1 is a plan view showing a portion of the thrashing-cylinder and self-feeder, the casing for this being cut away in horizontal section, also the end of the carrying-belt or draper and my intermediate shaking table. Fig. 2 is a vertical section on line *x x* of Fig. 1, showing the delivery end of the draper, the shaking table and means for operating it, and the self-feeder upon which the straw is delivered.

In the usual construction of headers and thrashers the grain is delivered from the upper end of the draper, so as to fall approximately upon the self-feeder, which delivers it to the cylinder; but a great deal of the straw and chaff fall down from the end of the belt and soon become piled up and clogged in this space. My invention is designed to overcome this difficulty by providing a constantly-moving shaking table intermediate between the draper and the self-feeder.

A is a portion of the thrashing-cylinder of a thrashing-machine, and B is the self-feeder, which consists of parallel chains passing over sprocket-wheels at opposite ends and having the transverse slats extending between the chains, these slats dragging over a table, preferably made of sheet metal, and delivering straw in a constant stream to the thrashing-cylinder.

C is the upper end of the draper or carrying-belt, which receives the cut straw from the sickle and delivers it to the self-feeder.

D is a board or table which is hinged at E, Fig. 2, to the side of the casing within which the self-feeder B travels. This table may be of any suitable or convenient shape or size, being modified to suit the particular machine to which it is attached and the relative position of the draper to the self-feeder. In the present case it is made wider at one end than at the other and extends a short distance beneath the upper or discharge end of the draper C. This end of the table D is connected to a crank-shaft F by a pitman G. This crank-shaft is caused to rotate by belt and pulley from any convenient portion of the machine, and by reason of its rotation it causes the table D to vibrate constantly about its hinge, thus shaking any straw or chaff which may fall upon it, so that it will pass down the incline of the table and fall upon the self-feeder B.

In the present case I have shown the table D as having a vertical movement about the hinge E; but it will be manifest that it may be supported so as to have an end or side shake or an oscillating motion about a central pivot, the object being in each case to provide such a shake or oscillation as will keep the straw and chaff which may fall upon it constantly in motion and prevent its lodging or clogging between the draper and self-feeder.

Having thus described my invention, what I claim as new, and desire to secure by Letters Patent, is—

1. In a traveling harvester, the combination, with the thrashing-cylinder, the mechanism whereby straw is delivered thereto, and a carrying-belt or draper which delivers straw from the sickle of the thrasher, of an oscillating or shaking closed table intermediate between the draper and the mechanism whereby straw is delivered to the thrashing-machine, substantially as described.

2. The thrashing-cylinder, self-feeder, and carrying-belt or draper of a header and thrasher, in combination with the oscillating or shaking table D, suspended between the discharge end of the draper and the self-feeder of the thrasher, and the mechanism whereby said table may be oscillated or shaken, substantially as described.

In witness whereof I have hereunto set my hand.

BENJAMIN HOLT.

Witnesses:
 GEO. H. COWIE,
 ALBERT HEALEY.